United States Patent
Davies, Jr.

(10) Patent No.: US 8,282,070 B2
(45) Date of Patent: Oct. 9, 2012

(54) APPARATUS AND METHODS FOR MANUAL OVERRIDE OPERATION OF A LINEAR ACTUATOR

(75) Inventor: Lonnie Oscar Davies, Jr., Newton, IA (US)

(73) Assignee: Fisher Controls International LLC, Marshalltown, IA (US)

( * ) Notice: Subject to any disclaimer, the term of this patent is extended or adjusted under 35 U.S.C. 154(b) by 1234 days.

(21) Appl. No.: 11/859,408

(22) Filed: Sep. 21, 2007

(65) Prior Publication Data

US 2009/0078894 A1     Mar. 26, 2009

(51) Int. Cl.
*F16K 31/00* (2006.01)
(52) U.S. Cl. ........................................ 251/14; 91/391 R
(58) Field of Classification Search .............. 251/14, 251/293, 291, 62, 101, 95; 91/391 R
See application file for complete search history.

(56) References Cited

U.S. PATENT DOCUMENTS

| | | | | |
|---|---|---|---|---|
| 935,856 | A * | 10/1909 | O'Meara | 251/291 |
| 2,403,427 | A * | 7/1946 | Ludeman | 251/14 |
| 2,630,829 | A * | 3/1953 | Shafer | 251/14 |
| 2,885,172 | A * | 5/1959 | Natho | 251/14 |
| 2,890,014 | A | 6/1959 | Luoma et al. | |
| 3,290,003 | A * | 12/1966 | Kessler | 251/318 |
| 3,734,455 | A * | 5/1973 | Natho et al. | 251/62 |
| 3,842,690 | A | 10/1974 | Gulick | |
| 3,842,854 | A * | 10/1974 | Wicke | 137/77 |
| RE29,322 | E | 7/1977 | Nelson | |
| 4,194,718 | A * | 3/1980 | Baker et al. | 251/14 |
| 4,414,995 | A * | 11/1983 | Spencer | 137/77 |
| 4,605,039 | A | 8/1986 | Johnson et al. | |
| 4,619,434 | A | 10/1986 | Snyder et al. | |
| 4,921,207 | A | 5/1990 | Baker | |
| 4,987,822 | A | 1/1991 | Stoll | |
| 5,477,752 | A | 12/1995 | West et al. | |
| 6,722,528 | B2 | 4/2004 | Baumann | |
| 6,854,704 | B1 * | 2/2005 | Young | 251/61.4 |
| 2005/0199292 | A1 | 9/2005 | Stedman et al. | |
| 2008/0149874 | A1 | 6/2008 | Fukano et al. | |

FOREIGN PATENT DOCUMENTS

| | | |
|---|---|---|
| DE | 1113344 | 8/1961 |
| EP | 0655574 | 5/1995 |
| EP | 1344947 | 9/2003 |
| EP | 1793114 | 6/2007 |
| FR | 1300618 | 8/1962 |
| WO | 0246652 | 6/2002 |

OTHER PUBLICATIONS

The International Searching Authority, "International Search Report," issued in connection with counterpart international application No. PCT/US2008/076251, mailed Dec. 23, 2008, 4 pages.

(Continued)

*Primary Examiner* — John K Fristoe, Jr.
*Assistant Examiner* — Andrew J Rost
(74) *Attorney, Agent, or Firm* — Hanley, Flight & Zimmerman, LLC (57) ABSTRACT

Apparatus and methods for manual override operation of a linear actuator are described. An example apparatus includes a base to be mounted to an actuator. A drive member is operatively coupled to the base and selectively engagable to a stem of the actuator to enable manual operation of the actuator in a first direction and a second direction.

23 Claims, 6 Drawing Sheets

OTHER PUBLICATIONS

The International Searching Authority, "Written Opinion of the International Searching Authority," issued in connection with counterpart international application No. PCT/US2008/076251, mailed Dec. 23, 2008, 5 pages.

International Searching Authority, "International Search Report," issued in connection with international application serial No. PCT/US2010/021392, mailed May 7, 2010, 3 pages.

International Searching Authority, "Written Opinion of the International Searching Authority," issued in connection with international application serial No. PCT/US2010/021392, mailed May 7, 2010, 5 pages.

United States Patent and Trademark Office, "Notice of Allowance," issued in connection with U.S. Appl. No. 12/365,663, mailed Jul. 28, 2011, 17 pages.

State Intellectual Property Office of P.R. China, "First Office Action," issued in connection with Chinese application serial No. 200880112173.5, mailed Nov. 23, 2011, 9 pages.

\* cited by examiner

APPARATUS AND METHODS FOR MANUAL OVERRIDE OPERATION OF A LINEAR ACTUATOR

FIELD OF THE DISCLOSURE

This disclosure relates generally to control valves and, more particularly, to apparatus and methods to manually override operation of a linear actuator.

BACKGROUND

Many process control valves are pneumatically actuated using well-known diaphragm type or piston type pneumatic actuators. Actuators automate control valves by supplying force and motion to open or close a valve. Pneumatic actuators are used to operate control valves such as, for example, linear valves, rotary valves, etc. Linear valves such as gate, globe, diaphragm, pinch, and angle valves typically have a valve stem (e.g., a sliding stem) that drives a flow control member (e.g., a plug) between an open position and a closed position. Rotary valves such as butterfly valves, ball valves, disk valves, etc. typically have a valve shaft that drives a flow control member between an open position and a closed position. Also, typically, an actuator stem operatively couples a linear valve stem or a rotary valve shaft to the actuator (e.g., a pneumatic actuator, hydraulic actuator, etc.).

In operation, a controller may cause an actuator to position a valve stem or shaft and, thus, a flow control member to a desired position to regulate the fluid flowing through a valve. When the valve is closed, the flow control member is typically configured to engage an annular or circumferential seal that encircles the flow path through the valve to prevent the flow of fluid (e.g., in one or both directions) through the valve.

During emergency situations, power failures, or if air supply to a pneumatic actuator is shut down, it may be necessary to manually override the position of the flow control member of a valve to a desired position (e.g., a closed position). Generally, known manual override mechanisms for control valves permit manual operation of a valve and do not require an outside power source to move the flow control member of the valve to a desired position. Instead, these known manual override mechanisms typically use a hand wheel, a chain wheel, a lever, a declutchable mechanism, or a combination thereof, to drive a series of gears (e.g., a worm drive gearbox, etc.) providing a reduction that results in a higher output torque compared to an input (manual) torque provided by a person.

Some known manual override mechanisms use a worm drive gearbox in which a self-locking worm and worm gear drive holds the valve in a desired position. However, this configuration usually requires aligning a hole in a manual override stem with a hole in an actuator stem and sliding a pin therethrough to engage the manual override mechanism. During emergency situations, this process can be time consuming and unacceptable. Other known applications utilize a declutchable worm drive gear box that involves manually engaging a lever to enable manual operation of a valve via a hand wheel. However, worm drive gearboxes are relatively expensive and involve complex assemblies with the actuator. Additionally, most known manual override mechanisms using a worm drive gearbox are only available as a factory installed option and cannot be retrofitted to existing valves in the field.

Another known example manual override mechanism provides a hand wheel and screw combination that is mounted directly to an actuator to manually operate a valve. However, this known configuration limits operation of some valves in one direction and, thus, once these valves are manually operated, the override mechanism cannot be used to operate the valve in the other or opposite direction.

SUMMARY

In one example, a manual override apparatus includes a base to be mounted to an actuator. The apparatus also includes a drive member operatively coupled to the base and selectively engagable to a stem of the actuator to enable manual operation of the actuator in a first direction and a second direction.

In another example, a manual override apparatus includes a support frame to be mounted to an actuator and a stem operatively coupled to the actuator. The example apparatus further includes a drive member operatively coupled to the support frame and selectively engagable to the stem to enable manual operation of the actuator to control the displacement of the actuator.

In yet another example, a method to override an actuator includes operatively coupling a support frame and a linear drive. The example method also includes mounting the support frame to the actuator, wherein the actuator comprises a stem. The method further includes selectively engaging the linear drive to the stem and manually operating the linear drive to move the stem between a first position and a second position.

DETAILED DESCRIPTION

In general, the example manual override apparatus described herein can be used to selectively engage, for example, a valve actuator to enable control of the actuator to position a flow control member of a valve at any position between a fully open position in which the flow of fluid through the valve is permitted and a fully closed position in which the flow of fluid through the valve is restricted or prevented. The example manual override apparatus discussed herein can be applied to pneumatically operated control valves having a linear actuator such as, for example, control valves, throttling valves, on/off valves, etc. In particular, the example manual override apparatus is particularly advantageous in use with dual actuated actuators (i.e., in which pressurized fluid is used to open and close the valve) and with fluid-to-open or fail-to-close actuated valves (i.e., in which a spring biases the valve in the closed position). Additionally, the example manual override apparatus described herein may be provided as a factory installed option or alternatively, can retrofit existing control valves in the field.

Figure 1A:
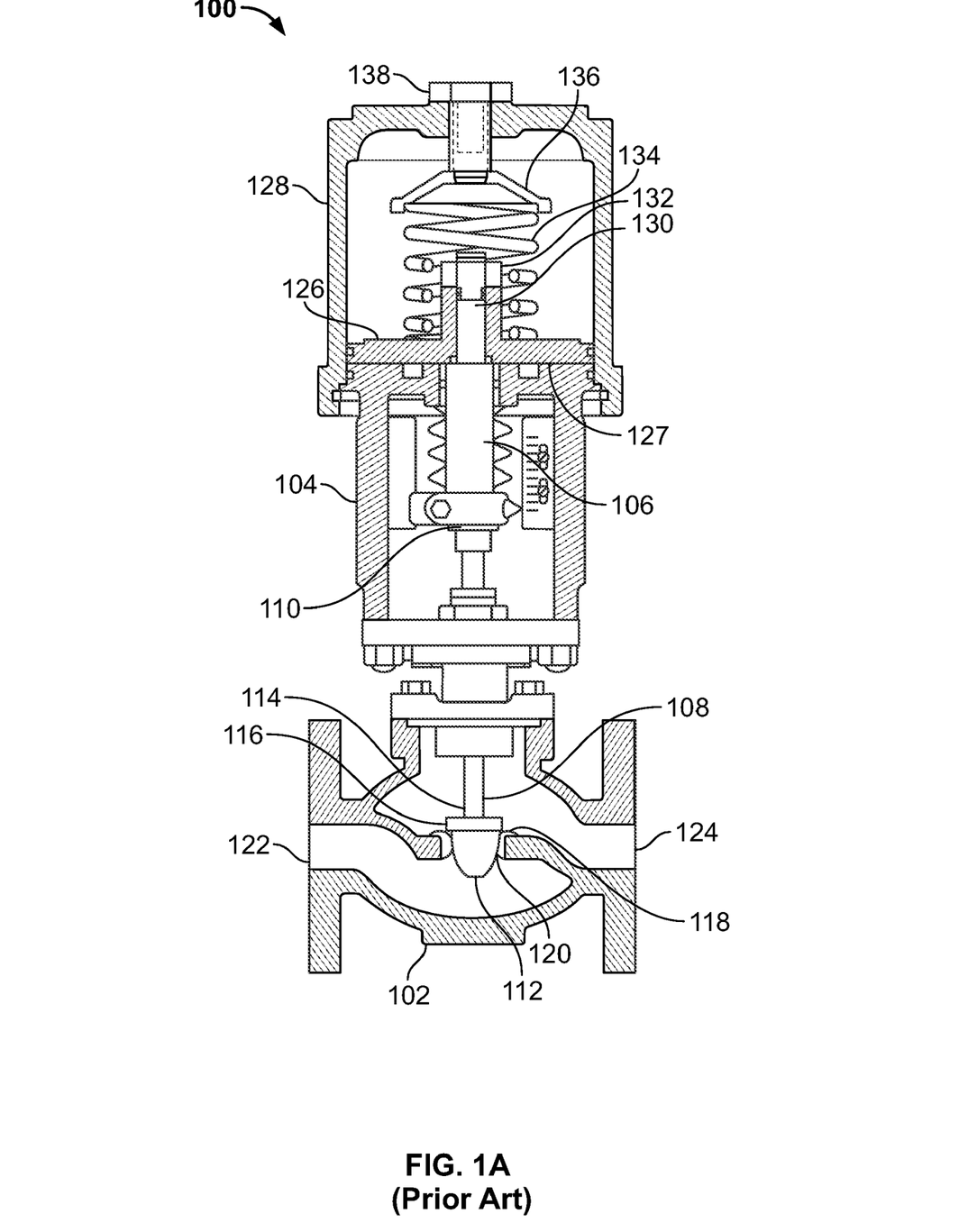
FIGS. 1A and 1B are cross-sectional side views of known control valves operated by piston and diaphragm pneumatic actuators, respectively.
Figure 1B:
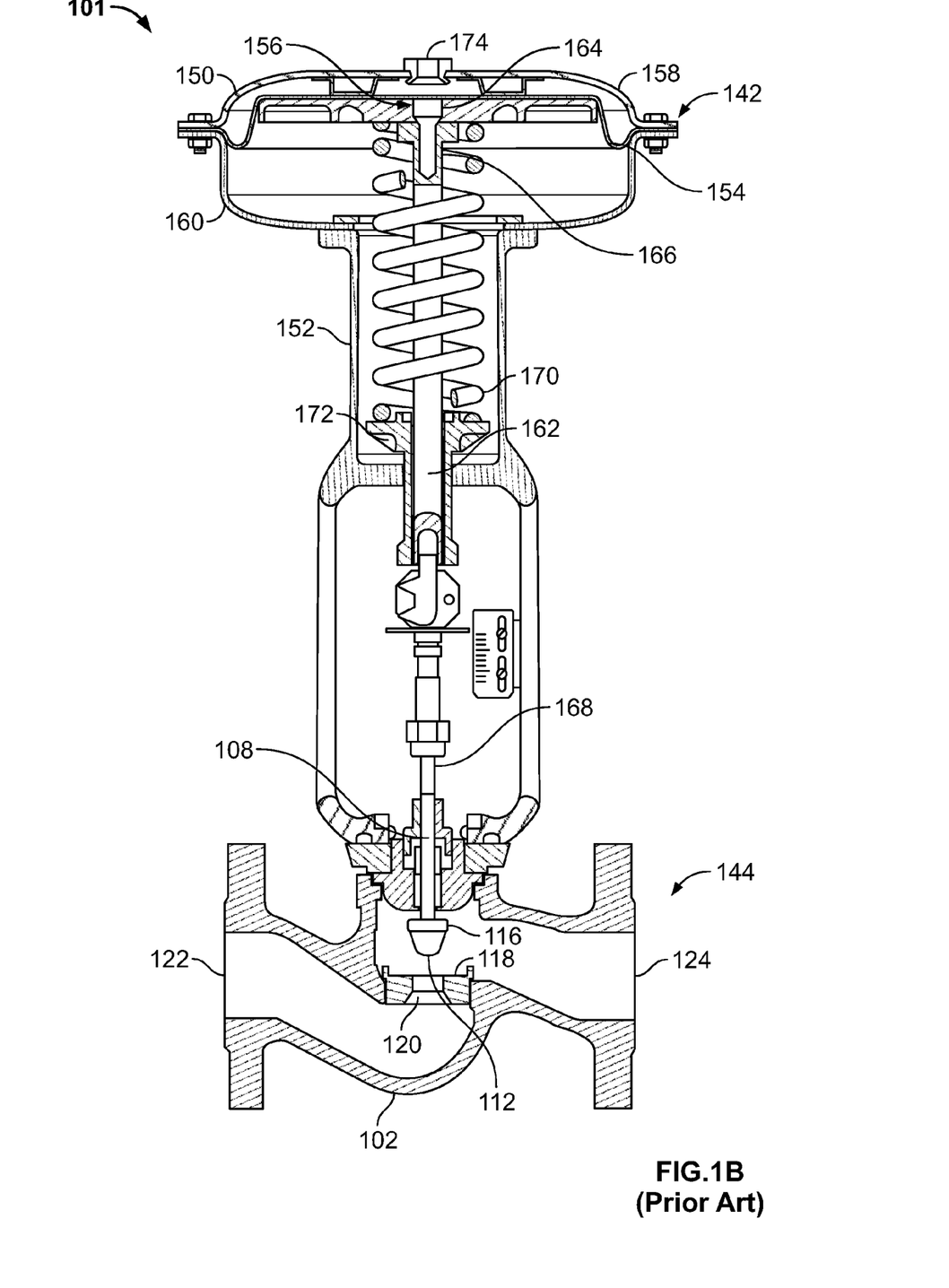

Before describing the example manual override apparatus a brief discussion of known pneumatically actuated control valves is first provided in connection with FIGS. 1A and 1B. Typically, a control valve assembly includes a valve body that houses internal trim parts and an actuator to provide the power to operate the valve. The valve body is the main pressure boundary of the valve housing that provides the fluid flow passageway, the pipe connecting ends, and supports the seating surfaces for a valve flow control member (e.g., a plug). The internal trim parts are internal components of a valve that control the flow of the fluid through the valve. For example, in a sliding stem valve (e.g., a globe valve), the trim can include a flow control member, a seat ring, a cage, a valve stem, and a stem pin.

Pneumatic actuators, such as piston actuators and diaphragm actuators, are commonly used to operate control valves. Example piston and diaphragm actuated control valves 100 and 101 are shown and described below in connection with FIGS. 1A and 1B, respectively. However, the example described in connection with the manual override apparatus is not limited to the example illustrations of FIGS. 1A and 1B and may be used with various types of valves such as, for example, a sliding stem valve (e.g., a gate valve, a globe valve, etc.) and a rotary valve (e.g., a ball valve, a disk valve, a butterfly valve, etc.) that are operated by a linear actuator such as, for example, the actuator 142 of FIG. 1B.

The control valve 100 shown in FIG. 1A includes a valve body 102 connected to a bonnet 104. The bonnet 104 houses an actuator stem 106 that is coupled to a valve stem 108 at a lower end 110 of the actuator stem 106. The valve stem 108 passes through the bonnet 104 and into the valve body 102. In the example, a valve plug 112 is coupled to a lower end 114 of the valve stem 108. The valve stem 108 and the valve plug 112 may be formed as a single piece, or may be formed in separate pieces for connection by common fastening methods. The valve plug 112 includes a seating surface 116 that cooperates with a valve seat 118 of an orifice 120 to control the port area through which fluid may flow from an inlet passage 122 to an outlet passage 124. Thus, the flow rate permitted through the control valve 100 is controlled by the position of the valve stem 108 and, thus, the position of the valve plug 112 relative to the valve seat 118 of the orifice 120. The position of the valve stem 108 may be varied from a closed position at which the valve plug 112 is in sealing engagement with the valve seat 118 to a fully open or maximum flow rate position.

The example illustration shown in FIG. 1A is commonly referred to as a fluid-to-open (i.e., fail-to-close) piston actuated valve. A piston 126 drives the valve plug 112 to the open position when a pressurized fluid such as air acts on a surface 127 of the piston 126. A piston cylinder casing 128 houses the piston 126 and is connected to the bonnet 104. The piston 126 is coupled to an upper end 130 of the actuator stem 106 with a nut 132. A spring 134 between a spring seat 136 and the piston 126 biases the valve plug 112 in the closed position absent pressurized fluid acting on the surface 127 of the piston 126.

In operation, pressurized fluid (e.g., air) may be applied through an inlet port (not shown) to cause the piston 126 to compress the spring 134 and move in a longitudinal path away from the valve body 102. This movement of the piston 126 causes the actuator stem 106, the valve stem 108 and, thus, the valve plug 112 to move away from the valve seat 118 to permit fluid to flow through the orifice 120. When the air pressure on the piston 126 is released or removed, the piston 126 and the actuator stem 106 move under the influence of the spring 134 to cause the valve plug 112 to move toward and/or into contact with the valve seat 118 to restrict fluid flow through the orifice 120. An adjustable screw 138 can be used to limit maximum fluid flow by acting as a stop to limit the travel of the piston 126 and the actuator stem 106.

In the example of FIG. 1B, a diaphragm actuator 142 is coupled to a valve 144 that is substantially similar to the valve depicted in FIG. 1A. Those components of the valve 144 that are similar or identical to the valve in FIG. 1A are labeled with the same reference numbers. The control valve 101 of FIG. 1B is commonly referred to as fluid-to-close (i.e., fail-to-open) diaphragm actuated valve. A diaphragm casing 150 is connected to a bonnet 152 and houses a diaphragm 154 that responds to control pressures to move a central mounting hub 156. The diaphragm casing 150 has an upper 158 portion and a lower 160 portion that are fastened together via screws or bolts. The central mounting hub 156 is coupled to a stem 162 of the actuator 142 with a hub nut 164 at an upper end 166 of the stem 162. The stem 162 is coupled to the valve stem 108 at a lower end 168 of the stem 162 and, in turn, the valve stem 108 is coupled to the valve plug 112. A spring 170 between a spring seat 172 and the diaphragm 154 causes the valve plug 112 to move to an open position absent pressurized fluid acting on the diaphragm 154. A vent plug 174 may be mounted to diaphragm casing 150 to release the pressurized fluid from the casing 150.

Figure 2A:
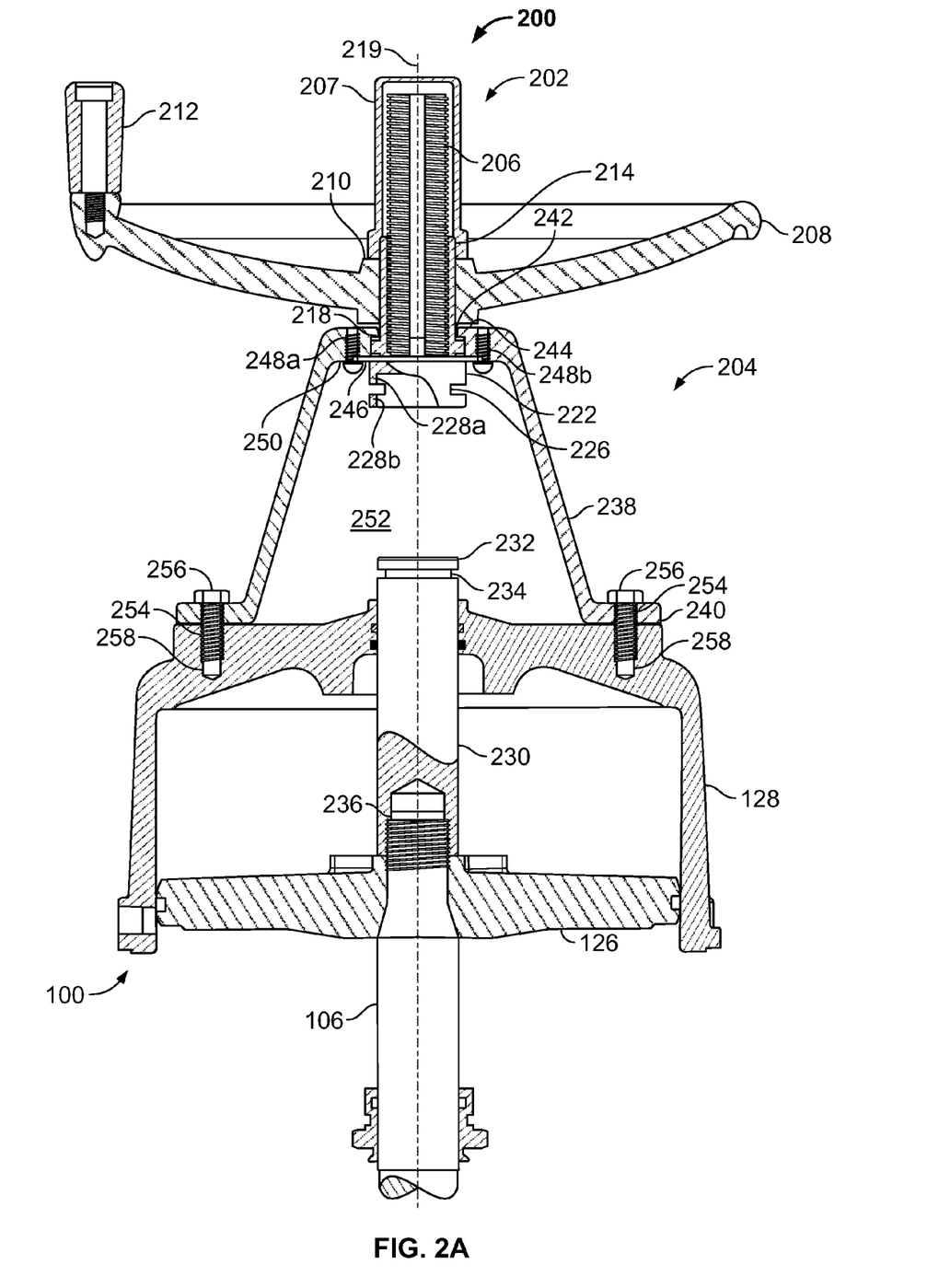
FIG. 2A is cross-sectional view of an example manual override apparatus.

FIG. 2A illustrates an example manual override apparatus 200. The example override apparatus 200 includes an override mechanism or drive member 202 to manually operate an actuator, and a support frame or base 204 that mounts the override mechanism or drive member 202 to an actuator. In the example illustration, the override mechanism or drive member 202 has a threaded member 206 coupled to a rotating member 208. As shown, the rotating member can be a hand wheel 208 having a bushing 210 located substantially near its center and a handle 212. The bushing 210 of the hand wheel 208 is coaxially coupled to a threaded thrust nut 214 having an internally threaded body 216 (FIG. 2B) and a head 218. The threaded member 206 is shown by way of example as an externally threaded elongated screw. The thrust nut 214 is threadably engaged with the elongated screw 206 such that rotating the hand wheel 208 in either a clockwise or counter-clockwise direction about a longitudinal axis 219 of the elongated screw 206 causes the elongated screw 206 to move (e.g., extend or retract) along a longitudinal or linear path. In other example implementations, the bushing 210 of the hand wheel 208 can be threaded and can be threadably engaged with the elongated screw 206. In yet other example implementations, the upper end of the elongated screw 206 can be formed in a square or other polygonal shape to receive a crank, a hand wheel, a wrench, etc., for manual rotation of the elongated screw 206. A cap 207 may be included to cover the elongated screw 206 to protect it from dirt and/or damage.

In the illustrated example, a collar 222 is coupled to a lowermost end portion 224 (FIG. 2B) of the elongated screw 206. The collar 222 has an outer wall including a groove or channel 226 formed therein to retain a clip 300 (FIG. 3B), and has stepped inner or interior walls 228a and 228b separated by the groove 226 and which are sized to receive and engage the stem of the actuator as discussed below. In the example illustration, the collar 222 and the elongated screw 206 are integrally formed as a substantially unitary or single piece structure via any suitable process(es) such as, for example, machining, etc. However, in other example implementations, the collar 222 and the elongated screw 206 can be formed as separate pieces and coupled via mechanical fasteners, welding, or any suitable fastening mechanism(s).

The drive member 202 is substantially coaxially aligned with the stem 106 so that the stem 106 can extend through the casing 128 of the actuator 100 (FIG. 1A) to selectively engage the drive member 202 to enable manual operation of the actuator 100. As shown in the example implementation, a cylindrical member or override stem 230 is operatively coupled to the actuator stem 106 at one end to form an extended actuator stem. The cylindrical member or override stem 230 has a lip 232 formed by a recessed groove 234 at its other end. The lip 232 of the override stem 230 is sized to be removably coupled to the collar 222 such that the lip 232 engages the stepped interior wall 228a of the collar 222. The override stem 230 replaces the piston nut 132 (FIG. 1A) in a piston actuator, or the hub nut 164 (FIG. 1B) in a diaphragm actuator. The actuator stem 106 is threaded into a threaded bore 236 of the override stem 230 to couple the override stem 230 to the piston 126. In other example implementations, the override stem 230 can be operatively coupled to the actuator stem 106 and/or the piston 126 via mechanical fasteners, welding, or other suitable fastening mechanism(s). The example manual override apparatus 200 does not interfere or affect the operation of the actuator 100 when the collar 222 is not engaged with the override stem 230.

As illustrated in FIG. 2A, the support frame or base 204 may have a generally conically shaped body 238 having a flange 240 at one end, and an aperture 242 for receiving the elongated screw 206 and thrust nut 214 at the other end. The aperture 242 has a stepped interior wall 244 that is sized to receive the head 218 of the thrust nut 214 to enable it to rotate therein. A retaining washer 246 is fastened via screws 248a and 248b to an interior surface 250 of the support frame or base 204. The stepped interior wall 244 and the retaining washer 246 secure the thrust nut 214 in its position as the elongated screw 206 rotates and travels or moves along the longitudinal axis 219. In other example implementations, the aperture 242 can be threaded to threadably engage the elongated screw 206. The support frame or base 204 can be made of aluminum, steel, or any other suitable material.

The support frame or base 204 can have an opening portion 252 via which the collar 222 and the override stem 230 are accessible from outside of the support frame or base 204 to selectively engage the manual override apparatus 200 to the actuator 100. In other example implementations, a cover or a door may cover the opening 252 to prevent dirt and/or debris from contaminating the elongated screw 206, the collar 222 and/or the override stem 230.

The flange 240 of the support frame or base 204 has a plurality of mounting holes 254 therethrough for mounting the support frame or base 204 to the casing 128 of the actuator 100. The support frame or base 204 can be mounted to the casing 128 via bolts 256 or any other suitable fasteners that pass through the plurality of mounting holes 254 and engage corresponding threaded bores 258 in the casing 128. In other example implementations, the support frame or base 204 can be fastened to the casing 128 by other means such as, for example, welding, rivets, hooks, clips, etc. In yet other example implementations, the support frame or base 204 and the casing 128 can be integrally formed (e.g., via injection molding) to produce a unitary or single piece structure.

Figure 2B:
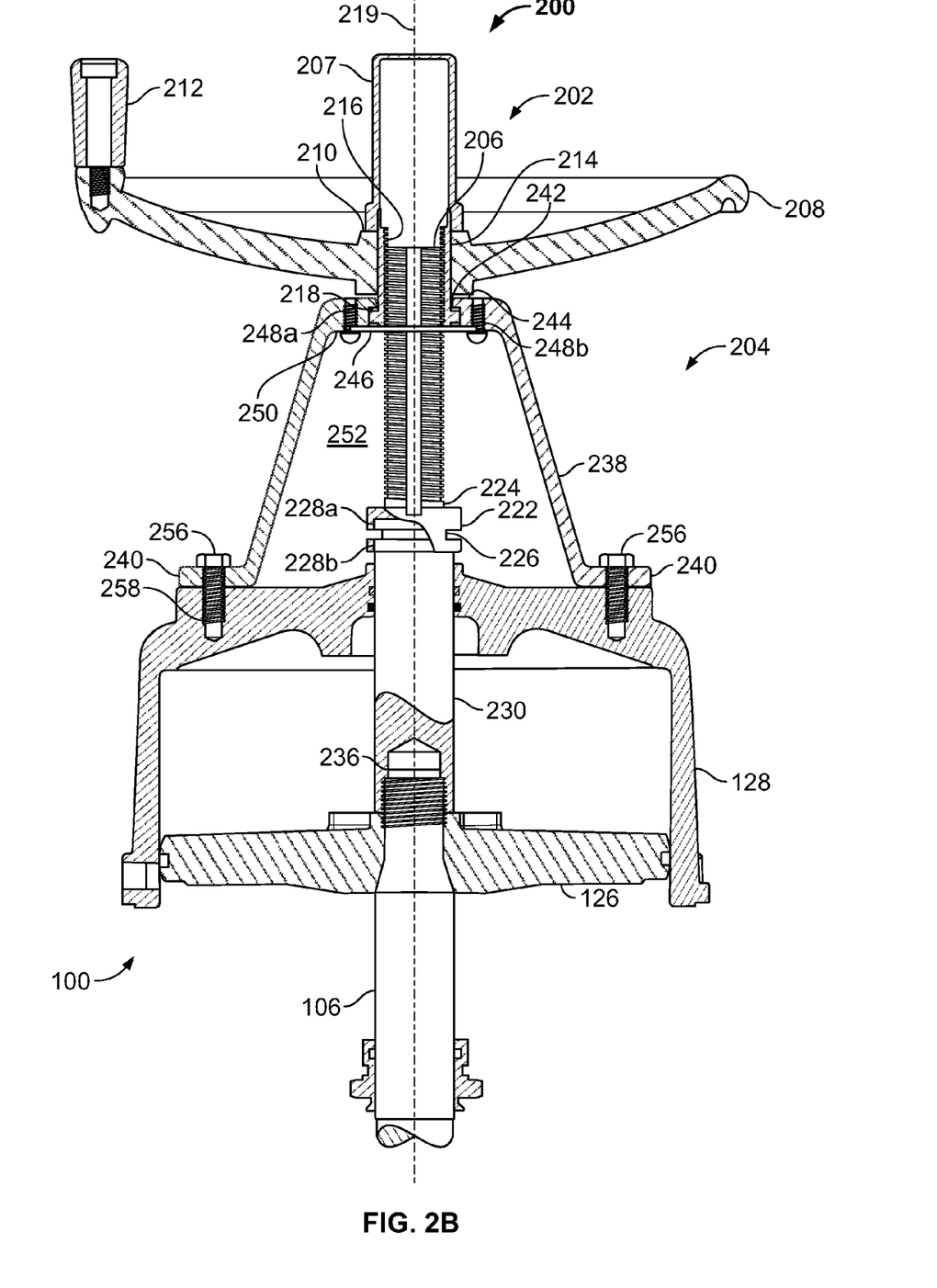
FIG. 2B is cross-sectional view of the example manual override apparatus of FIG. 2A operatively engaged to an actuator stem.

FIG. 2B illustrates the manual override 200 apparatus selectively and operatively engaged to an actuator. As discussed above, the collar 222 may be selectively engaged to the override stem 230 to expeditiously open or close a valve, depending on the configuration of the valve (i.e., fluid-to-open, fluid-to-close, etc.), in an emergency situation without requiring manual engagement of the collar 222 and the override stem 230. In this manner, the collar 222 engages to the override stem 230 to enable manual operation of the actuator 100 between a first direction and a second direction that is opposite the first direction (e.g., to move the stem 106 of the actuator 100 in both directions along the longitudinal axis 219).

Figure 3A:
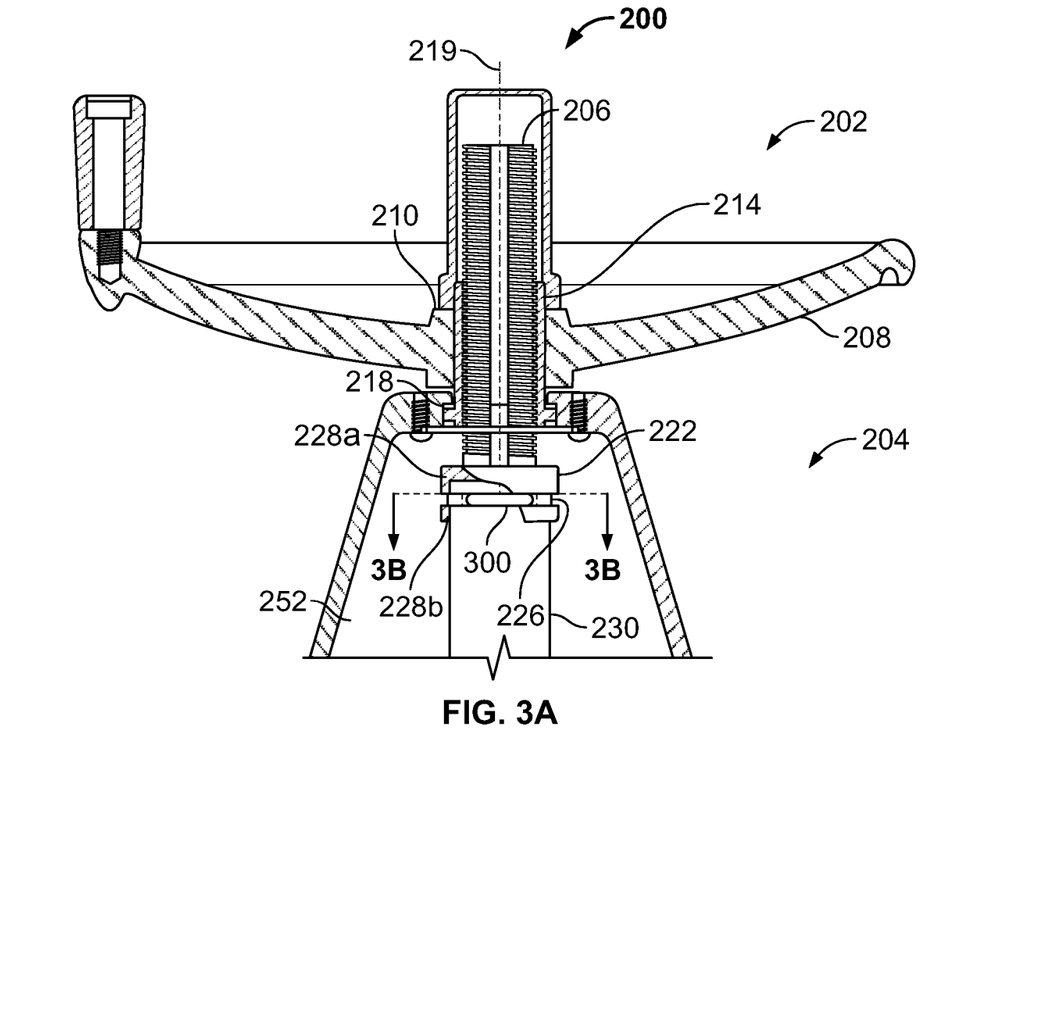
FIG. 3A is a cross-sectional view of the example manual override apparatus of FIGS. 2A and 2B depicting a clip coupling the manual override apparatus to the actuator stem.
Figure 3B:
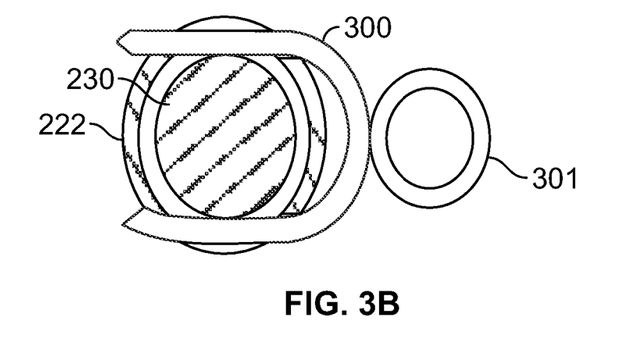
FIG. 3B is an enlarged view of the example clip of FIG. 3A.

FIGS. 3A and 3B illustrate an example removable U-shaped clip 300 that can be used with the example manual override apparatus 200 to couple the collar 222 to the override stem 230 to manually control the position of an actuator and a valve coupled to the actuator. The clip 300 is sized to engage the grooves 226 and 234 (FIG. 2A), thereby coupling the collar 222 to the override stem 230. As illustrated, the clip 300 may have a ring 301 to aid with insertion and removal of the clip 300 from the collar 222.

Referring to FIGS. 2A-3B, when a pneumatic actuator (e.g., the actuator 100) is operating normally, the manual override apparatus 200 is disengaged (FIG. 2A) from the override stem 230 and the override stem 230 can move freely with the piston 126 without interference from the manual override apparatus 200. To use the manual override apparatus 200, an operator rotates the hand wheel 208 to extend the elongated screw 206 to selectively engage the collar 222 to the override stem 230 to manually move the stem 106 of the actuator 100. In the illustrated example, the clip 300 is coupled to the collar 222 via the groove 226 when the manual override apparatus 200 is disengaged from the override stem 230. As the collar 222 engages with the override stem 230, the clip 300 expands over the lip 232 and snap fits into the groove 234 to couple the collar 222 and the override stem 230. In this manner, the manual override apparatus 200 engages the actuator without requiring manual engagement of the collar 222 and the override stem 230. When the collar 222 and the override stem 230 are engaged, the groove 234 of the override stem 230 substantially aligns with the groove 226 of the collar 222. However, in other example implementations, to couple the collar 222 to the override stem 230, the clip 300 can be manually inserted in the grooves 226 and 234 via the base opening 252 when the collar 222 is engaged with the override stem 230. In this manner, the collar 222 engages the override stem 230 and rotation of the hand wheel can manually operate the actuator in one direction until the clip 300 is manually inserted in grooves 226 and 234.

To manually control the direction of displacement of the actuator, an operator can rotate the hand wheel 208, either clockwise or counter-clockwise, to cause the elongated screw 206 to extend or retract and, thus, cause the collar 222 and the override stem 230 to travel in a longitudinal or linear path along the axis 219. Due to its coupling to the actuator stem 106, the override stem 230 causes the valve stem 108 and the valve plug 112 to travel along the axis 219. The range of travel includes, at one extreme, a closed position at which the valve plug 112 is in sealing engagement with the valve seat 118, and at another extreme, a fully open maximum flow rate position at which the valve stem 108 is moved to the full extent of its permitted travel. To disengage the manual override and return the valve to automatic operation, an operator, through the access opening in the support frame or base 204, removes the clip 300 and rotates the hand wheel 208 to retract the elongated screw 206 and the collar 222 to the position shown in FIG. 2A and, thereby disengaging the collar 222 from the override stem 230. When disengaged, an operator can reinsert the clip 300 into groove 226 of the collar 222. In other example implementations, the clip 300 can be attached to the manual override apparatus 200 (e.g., to the base 204) via a wire, string, etc.

Figure 4:
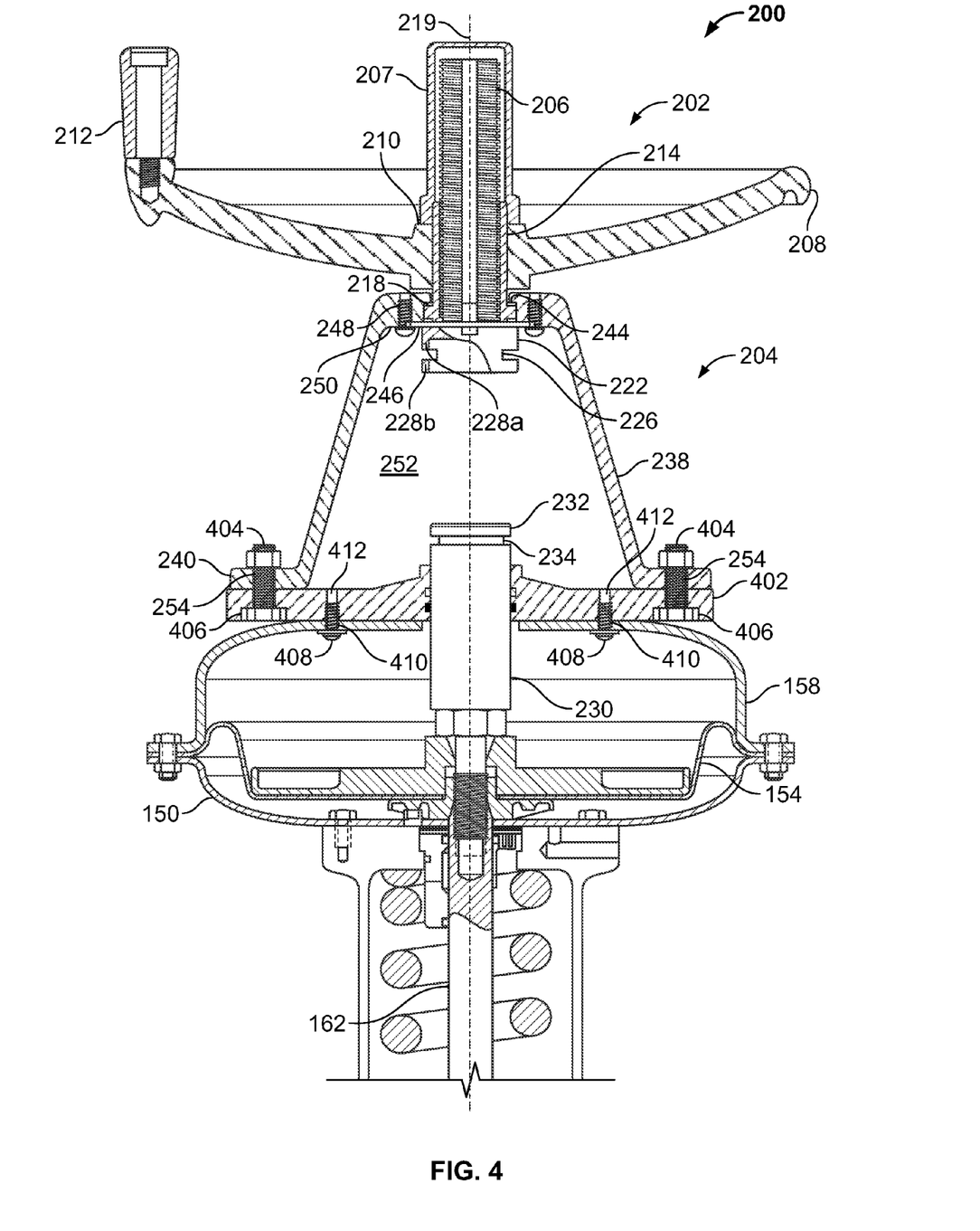
FIG. 4 is a cross-sectional side view of example manual override apparatus mounted to a diaphragm actuator.

The manual override apparatus 200 can be retrofitted to existing control valves that are already operating in the field. For example, FIG. 4 illustrates the control valve 101 of FIG. 1B retrofitted with the manual override apparatus 200. In the example, the vent plug 174 and the hub nut 164 are removed and replaced with the override stem 230. The override stem 230 is coupled to the actuator stem 162 of the diaphragm 154 by fastening the override stem 230 to the actuator stem 162. The support frame or base 204 of the manual override 200 can be mounted directly to the casing 150 of the valve. As shown in the example illustration, a plate 402 can be used if the flange 240 of the support frame or base 204 extends beyond the width of the casing 150 or if the surface of the casing 150 is such that the flange 240 cannot be mounted thereon. In the illustrated example, the support frame or base 204 is attached to the plate 402 via bolts 404 through a plurality of holes 406 in the plate 402 that correspond with the holes 254 of the flange 240. The plate 402 is then attached to the upper portion 158 of the casing 150 via cap screws 408 that extend through a plurality of holes 410 in the upper portion 158 of the casing 150 and engage a plurality of threaded bores 412 in the plate 402. In other example implementations, the support frame or base 204 can be attached to the plate 402 and/or the plate 402 can be attached to the casing 150 by welding, fasteners, or other suitable fastening mechanism(s). In yet other example implementations, the flange 240 can be curved to substantially match the contour of the casing 150 and mounted thereon.

Although certain methods, apparatus, and articles of manufacture have been described herein, the scope of coverage of this patent is not limited thereto. To the contrary, this patent covers all methods, apparatus, and articles of manufacture fairly falling within the scope of the appended claims either literally or under the doctrine of equivalents.

What is claimed is:

1. A manual override apparatus, comprising:
a base to be mounted to an actuator;
a drive member operatively coupled to the base;
a collar fixed to an end of the drive member and selectively engageable to a stem of the actuator; and
a clip to couple the stem to the collar, the clip to contact the stem and the collar, and wherein the stem and the collar are to be coupled via the clip without manually positioning the clip to enable manual operation of the actuator in a first direction and a second direction opposite the first direction.

2. An apparatus described in claim 1, wherein the drive member is to be substantially coaxially aligned with the stem.

3. An apparatus described in claim 1, wherein the drive member comprises a threaded portion operatively coupled to a rotating member so that rotation of the rotating member causes the drive member to extend or retract to move the stem of the actuator.

4. An apparatus described in claim 3, wherein the threaded portion comprises a screw.

5. An apparatus described in claim 3, wherein the rotating member comprises a hand wheel.

6. An apparatus described in claim 1, wherein the base has an opening for access to engage the stem to the drive member.

7. An apparatus described in claim 1, wherein the base comprises a flange to mount the base to the actuator.

8. An apparatus described in claim 1, wherein the actuator is a pneumatic actuator.

9. An apparatus described in claim 1, wherein the stem has a groove around the periphery of the stem forming a lip at one end of the stem, and wherein the collar has openings to retain the clip prior to engaging the stem and collar and to enable the clip to expand around the lip when the stem engages the collar to allow the clip to engage the groove to couple the stem to the collar via the clip.

10. An apparatus described in claim 1, wherein the clip comprises a handle to insert and remove the clip.

11. An apparatus described in claim 1, wherein the apparatus is to manually operate the actuator independent of fluid pressure in a valve associated with the actuator.

12. A manual override apparatus, comprising:
a support frame to be mounted to an actuator;
a stem operatively coupled to the actuator, wherein the stem has a groove adjacent an end of the stem;
a drive member operatively coupled to the support frame;
a collar coupled to an end of the drive member and selectively engageable to the stem, wherein the collar comprises a notch and wherein the end of the collar is separated from the stem in a longitudinal direction until the collar engages the stem; and
a clip to couple the collar to the stem by engaging the groove of the stem through the notch to operation of manually override the actuator and to operate the actuator in a first direction and a second direction opposite the first direction.

13. An apparatus defined in claim 12, wherein the drive member comprises a screw operatively coupled to a hand wheel so that rotation of the hand wheel causes the screw to extend or retract to manually operate the actuator.

14. An apparatus defined in claim 12, wherein the groove forms a lip at one end of the stem to couple the stem to the collar.

15. An apparatus described in claim 12, wherein the clip is U-shaped.

16. An apparatus described in claim 12, wherein the drive member can be positioned away from the stem when the actuator is not being manually overridden.

17. A method to override an actuator, the method comprising:
operatively coupling a support frame and a linear drive;
mounting the support frame to the actuator, wherein the actuator comprises a stem;
selectively engaging the linear drive to the stem in an axial direction via a user removable clip; and
manually operating the linear drive to cause the linear drive to push the stem in a first direction and to pull the stem in a second direction opposite the first direction.

18. The method described in claim 17, wherein manually operating the linear drive comprises rotating a hand wheel to drive a screw.

19. The method described in claim 18, wherein rotating the hand wheel in a clockwise direction causes the stem to move in the first direction and rotating the hand wheel in a counterclockwise direction causes the stem to move in the second direction.

20. The method described in claim 17, further comprising coupling an extended actuator stem to the stem of the actuator.

21. The method described in claim 20, further comprising selectively engaging the extended actuator stem and the linear drive and driving the extended actuator stem in the first direction and the second direction.

22. The method described in claim 17, further comprising coaxially aligning the linear drive and the stem.

23. The method described in claim 17, wherein selectively engaging the linear drive to the stem does not require manually positioning the clip to couple the linear drive to the stem.

* * * * *